(12) United States Patent  (10) Patent No.: US 8,146,612 B2
Brunswick et al.  (45) Date of Patent: Apr. 3, 2012

(54) WAREWASHER WITH WATER ENERGY RECOVERY SYSTEM

(75) Inventors: Brian A. Brunswick, Tipp City, OH (US); Matthew D. Naveau, Bellbrook, OH (US); Gregory L. Caylor, Dayton, OH (US); Stephen T. Miranda, Middleburg Heights, OH (US); Steven J. Kirk, Pearland, TX (US)

(73) Assignee: Premark FEG L.L.C., Wilmington, DE (US)

( * ) Notice: Subject to any disclaimer, the term of this patent is extended or adjusted under 35 U.S.C. 154(b) by 759 days.

(21) Appl. No.: 12/185,602

(22) Filed: Aug. 4, 2008

(65) Prior Publication Data

US 2010/0024844 A1    Feb. 4, 2010

(51) Int. Cl.
*B08B 3/00* (2006.01)
*B08B 3/04* (2006.01)

(52) U.S. Cl. ............... 134/107; 134/56 D; 134/57 D; 134/58 D; 134/104.2

(58) Field of Classification Search ............. 134/56 D, 134/57 D, 58 D, 104.2, 105, 107
See application file for complete search history.

(56) References Cited

U.S. PATENT DOCUMENTS

| | | | | |
|---|---|---|---|---|
| 3,946,802 A | * | 3/1976 | Christenson | 165/297 |
| 4,219,044 A | * | 8/1980 | Wilson | 137/340 |
| 4,326,551 A | * | 4/1982 | Voorhees | 134/58 D |
| 4,529,032 A | * | 7/1985 | Molitor | 165/301 |
| 5,660,193 A | * | 8/1997 | Archer et al. | 134/56 D |
| 5,816,273 A | | 10/1998 | Milocco et al. | |
| 5,829,459 A | | 11/1998 | Milocca et al. | |
| 6,591,846 B1 | | 7/2003 | Ferguson et al. | |
| 2007/0143914 A1 | * | 6/2007 | Shirai et al. | 4/420.2 |

FOREIGN PATENT DOCUMENTS

KR  20080058129  6/2008

* cited by examiner

*Primary Examiner* — Michael Barr
*Assistant Examiner* — Charles W Kling
(74) *Attorney, Agent, or Firm* — Thompson Hine LLP

(57) ABSTRACT

A warewash machine sump collects hot cleaning water that is recirculated in the chamber during cleaning. A drain line is for draining cleaning water from the sump. A fresh water input system includes at least a hot water input and a cold water input. The fresh water input system has a common input line in communication with the hot water input and the cold water input. A cold water input valve and hot water input valve are provided. The drain line and the common input line are arranged in a heat exchange relationship. A temperature sensor arrangement is associated with the drain line for determining temperature of the cleaning water traveling through the drain line. A controller controls the hot water input valve and cold water input valve based upon the temperature sensor arrangement output.

14 Claims, 3 Drawing Sheets

WAREWASHER WITH WATER ENERGY RECOVERY SYSTEM

TECHNICAL FIELD

This application relates generally to warewashers and, more particularly, to a warewasher with a water energy recovery system.

BACKGROUND

In some commercial warewash machines, drain water is at a temperature above that mandated by plumbing codes for draining. This is because cleaning water and rinse water are typically above this temperature during a cleaning operation. In order to cool the drain water, cold water is sometimes flushed down the drain with the drain water to lower water temperature.

Energy efficiency continues to be a significant issue in the field of warewash machines, particularly commercial warewash machines that tend to be high volume machines. It is known to provide heat recovery systems for recovering some heat from drain water that is being purged from the machine as exemplified by U.S. Pat. No. 5,660,193.

Nonetheless, it would be desirable to provide a warewash machine with a new and advantageous waste water energy recovery system.

SUMMARY

In an aspect, a warewash machine includes a housing at least in part defining a chamber for cleaning wares. A sump collects hot cleaning water that is recirculated in the chamber during cleaning. A drain line is for draining cleaning water from the sump. A fresh water input system includes at least a hot water input that receives hot water from a hot water source and a cold water input that receives cold water from a cold water source. The fresh water input system has a common input line in communication with the hot water input and the cold water input. A cold water input valve is for controlling input of cold water into the common input line. A hot water input valve is for controlling input of hot water into the common input line. The drain line and the common input line are arranged in a heat exchange relationship to enable heat from cleaning water traveling through the drain line to enable transfer of heat to water traveling through the common input line. A temperature sensor arrangement is associated with the drain line for determining temperature of the cleaning water traveling through the drain line. A controller receives input from the temperature sensor arrangement and is operable to control the cold water input valve and the hot water input valve such that, during a draining operation, if cleaning water traveling through the drain line is above a preselected temperature, the controller opens the cold water input valve to allow water from the cold water source to enter the common input line.

In another aspect, a warewash machine includes a housing at least in part defining a chamber for cleaning wares. A sump collects cleaning water that is recirculated in the chamber during cleaning. A drain line is for draining cleaning water from the sump. A fresh water input system includes at least a hot water input that receives hot water from a hot water source and a cold water input that receives cold water from a cold water source. The fresh water input system has a common input line in communication with the hot water input and the cold water input. The drain line and the common input line are arranged in a heat exchange relationship to enable heat from cleaning water traveling through the drain line to transfer heat to water traveling through the common input line. A storage tank receives water from the common input line once heated by cleaning water traveling through the drain line.

In another aspect, a method of providing water energy recovery in a warewash system is provided. The method includes initiating a tank filling operation using a fresh water input system to fill a sump with cleaning water. The fresh water input system includes at least a hot water input that receives hot water from a hot water source and a cold water input that receives cold water from a cold water source. The fresh water input system has a common input line in communication with the hot water input and the cold water input. A ware washing operation is initiated where the cleaning water is sprayed into a washing zone for cleaning wares. The sprayed cleaning water is recirculated in the washing zone and collected in the sump. A ware rinsing operation is initiated where hot water from the hot water source is delivered along the common input line and is sprayed into a rinsing zone. At least some of the cleaning water is drained from the sump along a drain line. Temperature of the cleaning water drained along the drain line is detected. If the temperature of the cleaning water is above a preselected temperature, delivery of hot water from the hot water source into the common input line is prevented and delivery of cold water from the cold water source into the common input line is allowed. The cold water from the cold water source is heated using energy from the cleaning water traveling along the drain line. The common input line and the drain line are in a heat exchange relationship to enable heat from cleaning water traveling through the drain line to heat water traveling through the common input line.

The details of one or more embodiments are set forth in the accompanying drawings and the description below. Other features, objects, and advantages will be apparent from the description and drawings, and from the claims.

DETAILED DESCRIPTION

Figure 1:
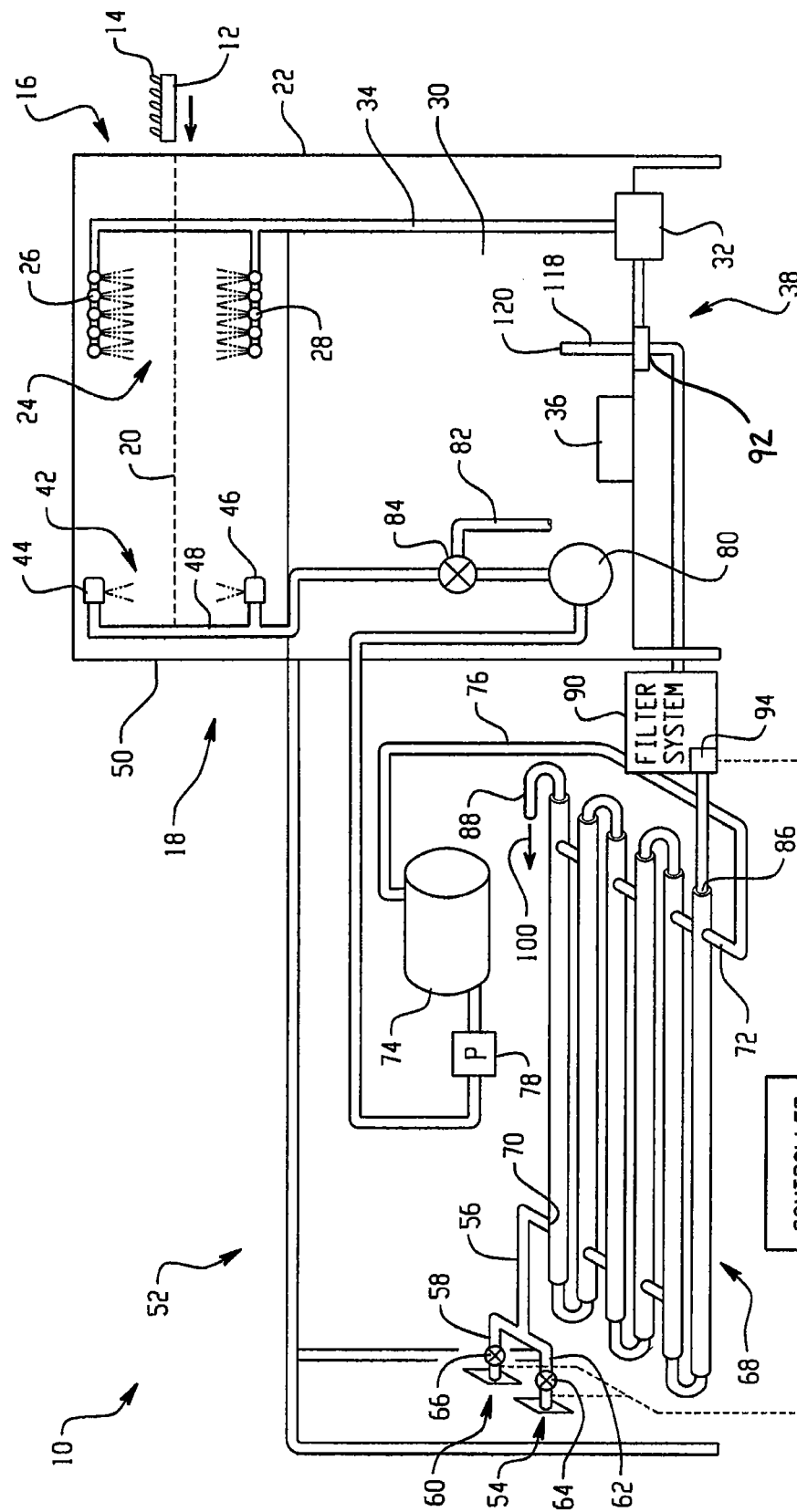
FIG. 1 is a diagrammatic, side section view of an embodiment of a warewash system.

Referring to FIG. 1, an exemplary conveyor-type warewash system, generally designated 10, is shown. Warewash system 10 can receive racks 12 of soiled wares 14 from an input side 16 which are moved through a tunnel-like chamber from the input side toward an output side 18 at an opposite end of the warewash system by a suitable conveyor mechanism 20. Either continuously or intermittently moving conveyor mechanisms or combinations thereof may be used, depending, for example, on the style, model and size of the warewash system 10. The racks 12 of soiled wares 14 enter the warewash system 10 through a flexible curtain 22 into a wash chamber or zone 24 where sprays of liquid from upper and lower wash manifolds 26 and 28 above and below the racks, respectively, function to flush heavier soil from the wares. The liquid for this purpose comes from a tank 30 via a pump 32 and supply conduit 34. A heater 36, such as an electrical immersion heater provided with suitable thermostatic controls (not shown), maintains the temperature of the cleansing liquid in the tank 30 at a suitable level (e.g., 160 degrees F. or more). A drain system 38 provides a location where liquid is drained from the tank 30, as will be described in greater detail below. Not shown, but which may be included, is a device for adding a cleansing detergent to the liquid in tank 30. During normal operation, pump 32 is continuously driven once the warewash system 10 is started for a period of time.

The warewash system 10 may optionally include a pre-wash and/or power rinse chamber or zone (not shown) that is substantially identical to the wash zone 24. In such instances, racks of wares proceed into a pre-wash chamber and/or from the wash zone into the power rinse chamber, within which heated rinse water is sprayed onto the wares from upper and lower manifolds. Separate tanks may also be provided for the pre-wash and/or power rinse chambers.

The racks 12 of wares 14 exit the wash zone 24, e.g., through a curtain (not shown) into a final rinse zone 42. The final rinse zone 42 is provided with upper and lower spray heads 44, 46 that are supplied with a flow of fresh hot water via pipe 48. A rack detector (not shown) may be actuated when rack 12 of wares 14 is positioned in the final rinse zone 42 and through suitable electrical controls, the detector causes actuation of a solenoid valve (not shown) to open and admit the hot rinse water to the spray heads 44, 46. The water then drains from the wares into tank 30. The rinsed rack 12 of wares 14 then exits the final rinse zone 42 through curtain 50 and, in some embodiments, moves into a dryer unit (not shown).

The warewash system 10 includes a drain water heat recovery system 52 that utilizes cleaning water to heat incoming cold water from a cold water source (represented by arrow 54) thereby reducing temperature of the cleaning water. A common input line 56 is connected to both a hot water input 58 that receives hot water (e.g., at about 110 degrees F.) from a hot water source (represented by arrow 60) and a cold water input 62 that receives cold water (e.g., at about 55 degrees F.) from the cold water source 54. A cold water input valve 64 is used to control inlet of cold water from the cold water source 54 to the common input line 56. Likewise, a hot water input valve 66 is used to control inlet of hot water from the hot water source 60 to the common input line.

The common input line 56 directs the incoming fresh water to a reverse flow heat exchanger 68 having a fresh water input end 70 and a fresh water output end 72. Any suitable heat exchanger configuration can be used such as a ten pass, reverse flow heat exchanger formed of, for example, stainless steel, copper, etc. that can handle the detergent and food particles in the cleaning water. A plated metal may also be used.

The fresh water output end 72 of the heat exchanger 68 is connected to a storage tank 74 capable of holding an amount of fresh water therein by a line 76. In some embodiments, the storage tank 74 is at least about 5 gallons. In some embodiments, the storage tank 74 is at least about 15 percent of the size of the tank 30, such as between about 20 percent and about 30 percent the size of the tank 30. In some embodiments, the storage tank 74 is sized to accommodate a multi-tank warewash system.

A pump 78 is used to pump the fresh water from the storage tank 76 to a booster heater 80 and then to the upper and lower spray heads 44 and 46. The booster heater 80 can be used to heat the fresh water between about 40 and 80 degrees F. A tank fill line 82 includes a control valve 84 for allowing a tank 30 fill operation.

The heat exchanger 68 also includes a drain water input end 86 and a drain water output end 88. The drain water input end 86 receives cleaning water drained from the tank 30. A filter system 90 is provided between the heat exchanger 68 and a drain 92 to filter larger particles from the cleaning water before it passes into the heat exchanger. A temperature sensor 94 is associated with the filter system 90 and used to determine the temperature of the cleaning water passing through the filter system. The temperature sensor 94 provides the temperature to a controller 96, which also controls operation of the hot water input valve 66 and cold water input valve 64. It should be noted that controller 96 may control an number of other components of the warewash system 10, such as valve 84, pumps 32 and 78, heater 36, etc., despite no connecting lines being drawn to those components for clarity. Additionally, while controller 96 is shown, the valves 64, 66, 84 and other components may be controlled using software based around the warewash control system. The drain water output end 88 is connected to a building drain (represented by arrow 100) through which the cleaning water can be drained.

Figure 2:
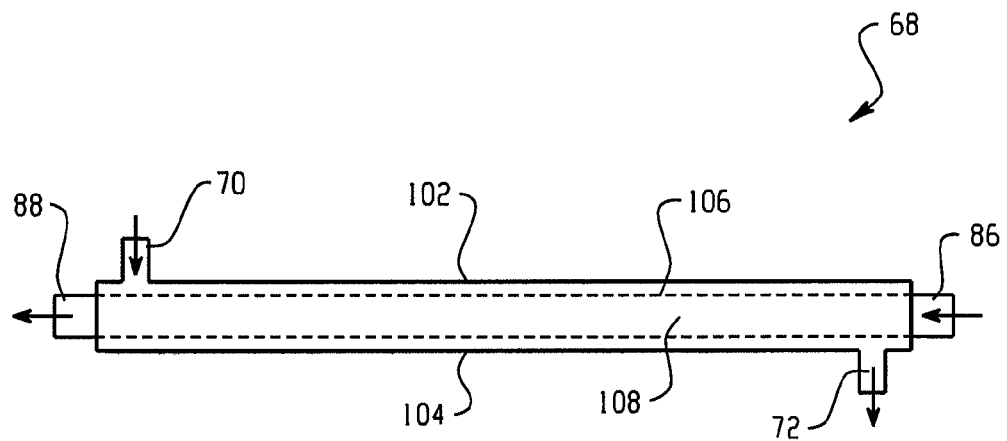
FIG. 2 is a diagrammatic, side view of an embodiment of a heat exchanger for use with the warewash system of FIG. 1.

FIG. 2 illustrates, diagrammatically, the reverse flow arrangement of the heat exchanger 68. During a heat exchange operation, the cold fresh water from the cold water source 54 flows into the fresh water input end 70 of the heat exchanger 68, travels through a passageway 102 formed between an outer heat exchange conduit 104 and an inner heat exchange conduit 106 and exits through the fresh water output end 72. The cleaning water from the tank 30 flows into the drain water input end 86, through a passageway 108 formed by the inner heat exchange conduit 106 and exits through the drain water output end 88 toward the building drain. During the heat exchange operation, the drain water may reduce in temperature between about 20 and about 60 degrees F., while the fresh water may increase in temperature between about 20 and about 60 degrees F. In some embodiments, the cleaning water may decrease in temperature from a temperature of between about 150 and 160 degrees F. at the drain water input end 86 of the heat exchanger 68 to a temperature of less than about 130 degrees F., such as between about 115 and 125 degrees F. at the drain water output end 88. In some embodiments, the fresh water entering the heat exchanger 68 from the cold water input 62 may increase in temperature from a temperature of about 55 degrees F. at the fresh water input end 70 to a temperature of between about 105 and about 115 degrees F. at the fresh water output end 72.

Figure 3:
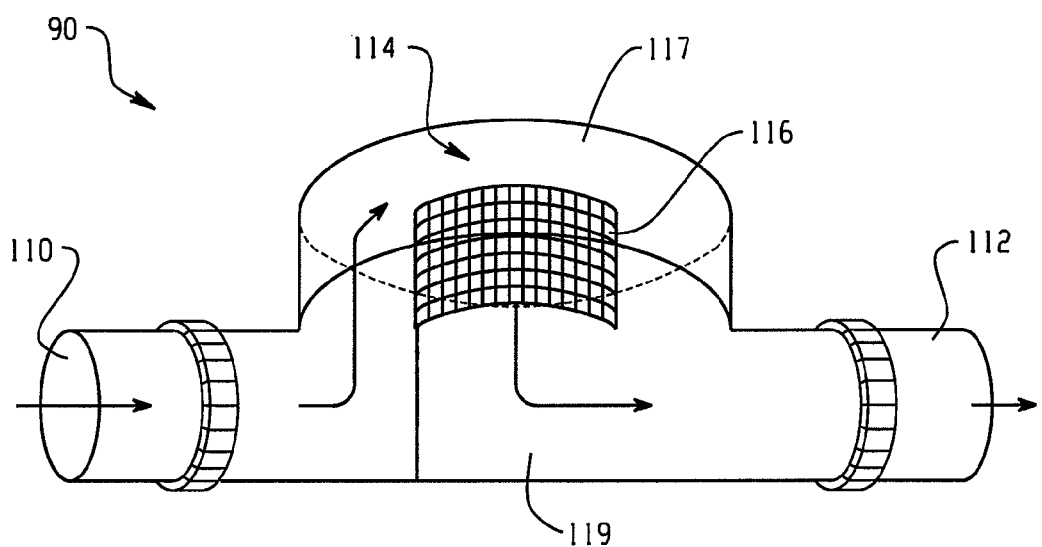
FIG. 3 is a perspective view of an embodiment of a filter system for use with the warewash system of FIG. 1.

Referring to FIG. 3, the filter system 90 includes an input end 110 in communication with the drain 92 of the tank 30 and an output end 112 in communication with the heat exchanger 68. A collection basin 114 collects particles filtered using a filter 116 (e.g., a screen, filter material, etc.) through which the cleaning water travels during draining. A removable cap 117 is provided to allow for ease of filter 116 replacement. In some embodiments, the cap 117 and/or housing 119 are formed of a transparent or translucent material that allows for viewing of the filter 116 from outside the filter system 90 to determine visually when the filter should be replaced. In some embodiments, the filter 116 may be attached to the cap 117 such that removal of the cap also removes the filter 116 from the housing 119.

Referring back to FIG. 1, during an initial tank fill operation (e.g., when the tank 30 is filled at the start of the day), the controller 96 determines that hot cleaning water is not being drained from the tank 30 through the drain 92 using the temperature sensor 94 and the controller opens the hot water input valve 66 thereby causing hot fresh water (e.g., at 110 degrees F.) to enter the common input line 56. The hot fresh water travels through the heat exchanger 68 and into the storage tank 76 thereby filling the storage tank with hot water. The pump 78 pumps the hot water from the storage tank 76 and into the booster heater 80 where the hot water is heated to a temperature of at least about 140 degrees F. The controller 96 opens the control valve 84 to allow the fresh hot water to fill the tank 30. In some embodiments, the tank 30 includes a float system (not shown) to prevent over filling.

At the beginning of a washing operation, the warewash system 10 suspends some of the cleaning water (e.g., about four gallons) in the tank 30 to fill the wash lines and spray some cleaning water on the wares thereby reducing the water level in the tank. When the rinse system is activated, initially, there is no cleaning water being drained due to use of an overflow pipe 118 having an opening 120 above the water level. The controller 96 recognizes that no hot cleaning water is being drained and allows fresh hot water to flow into the common input line 56, which flows into the booster heater 80 to feed the drain system.

After some time, the cleaning water begins to drain through the drain 92 due to the addition of the rinse water into the tank 30. The controller 96 recognizes that hot cleaning water (e.g., at least about 120 degrees or more, such as at least about 140 degrees F.) is being drained through the drain 92 using the temperature sensor 94 and, as a result, closes the hot water input valve 66 and opens the cold water input valve 64 thereby allowing cold water (e.g., at about 55 degrees F.) to enter the common input line 56. Hot cleaning water flowing from the filter system 90 and fresh cold water flowing from the cold water input 62 enter the heat exchanger 68 thereby reducing the temperature of the cleaning water before it enters the building drain 100 and increasing the temperature of the fresh water before it enters the storage tank 76 and booster heater 80 (where the fresh water is heated to a temperature of at least about 180 degrees F. for rinsing) and is pumped to the rinse system.

Once the rinse operation is stopped, cleaning water may continue to drain from the tank 30. The controller 96 recognizes this continued draining using the temperature sensor 94 and allows the fresh cold water to continue flowing into the common input line 56 to cool the cleaning water. The storage tank 76 is sized to collect the fresh water heated by the cleaning water in the heat exchanger 68.

When the warewash system 10 is stopped, cleaning water is eliminated from suspension (e.g., about four gallons), which is also drained through the drain system. The controller 96 recognizes this continued draining using the temperature sensor 94 and allows the fresh cold water to continue flowing into the common input line 56 to cool the cleaning water. In some embodiments, the controller 96 may pulse the fresh cold water using the cold water input valve 64 at a level to reduce the temperature of the cleaning water flowing through the heat exchanger 68 while reducing the amount of incoming fresh water which will be collected in the storage tank 76.

In some instances, it may be desirable to drain the tank 30 completely (in some embodiments, tank 30 may contain about 23 gallons of the cleaning water). During such a draining or dumping operation, the controller 96 recognizes this draining using the temperature sensor 94 and allows the fresh cold water to continue flowing into the common input line 56 to cool the cleaning water. In some embodiments, the controller 96 may pulse the fresh cold water using the cold water input valve 64 at a level to reduce the temperature of the cleaning water flowing through the heat exchanger 68 while reducing the amount of incoming fresh water which will be collected in the storage tank 76. The water collected by the storage tank 76 will be the initial water used to fill the tank 30 during the next initial tank fill operation. In any of the above operations, if the cleaning water is below the preselected temperature (e.g., of 140 degrees F.) as measured using the temperature sensor 94, the controller 96 recognizes this and can close the cold water input valve 64 or can leave the cold water input valve closed rather than admit fresh cold water.

Figure 4:
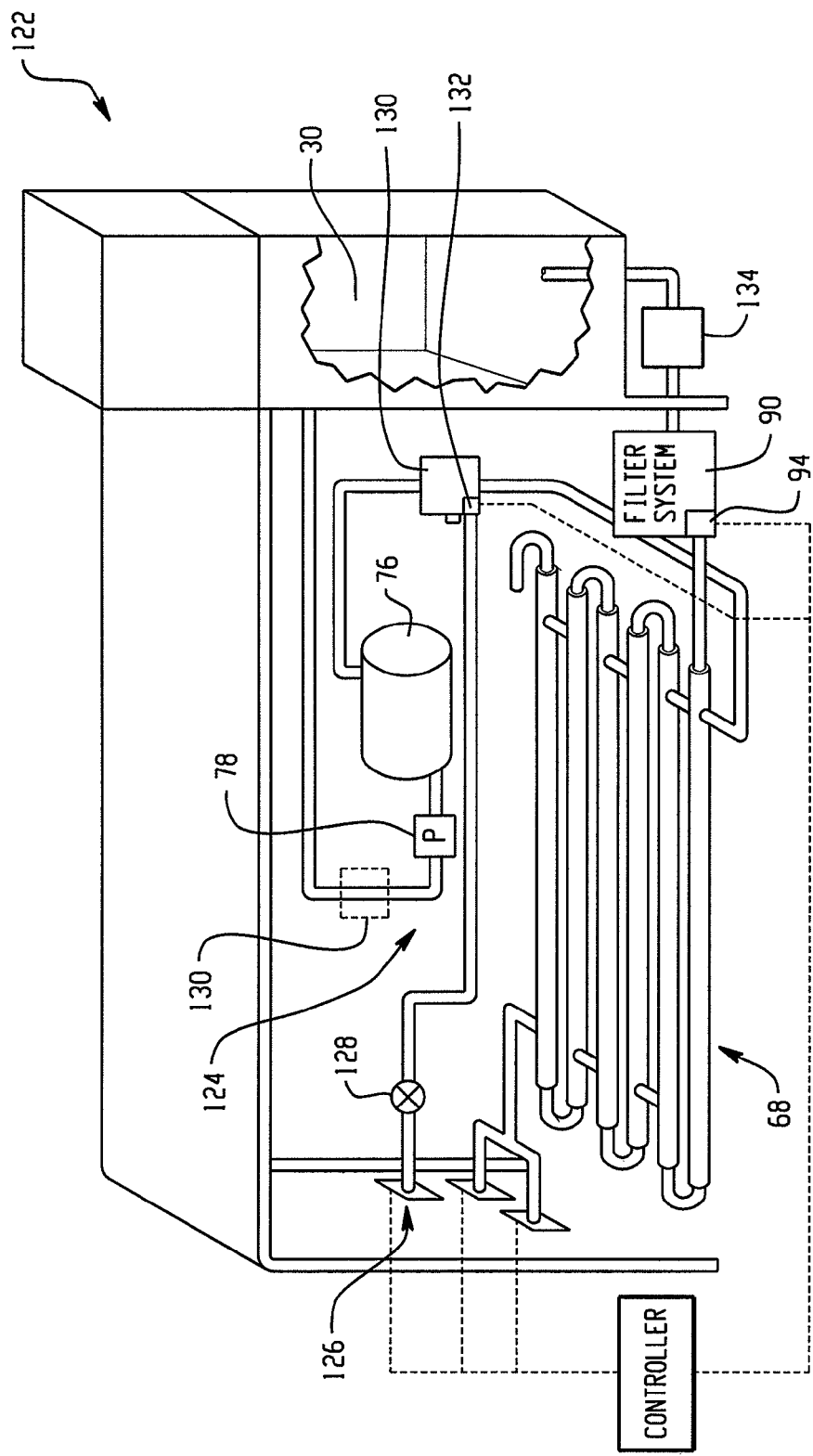
FIG. 4 is another embodiment of a warewasher system.

Referring to FIG. 4, an alternative drain water heat recovery system 122 is similar to the drain heat recovery system 52 described above and includes a hot water blending system 124 that includes a second hot water input 126 connected to the hot water source with hot water input valve 128 controlled by controller 96. Hot water input 126 can provide fresh hot water to a blending valve 130 connected to the fresh water line at a location downstream of the heat exchanger 68. A temperature sensor 132 is associated with the blending valve 130 to monitor temperature of the fresh water received from the heat exchanger 68. If the water temperature is too low (e.g., below 110 degrees F.), then the controller 96 can open the valve 128 to allow hot water to blend with water received from the heat exchanger 68. FIG. 4 also illustrates an alternative placement from the blending valve 130 downstream of the pump 78 and storage tank 76. In this embodiment, a drain pump 134 is also provided, which may also be utilized in the system of FIG. 1.

The above-described warewasher system with drain water heat recovery system may have a number of advantages including utilizing energy from the heated cleaning water to heat incoming, fresh cold water supplied to the rinse system. Use of the drain water heat recovery system can provide water savings in that water used to cool the cleaning water drained from the tank is supplied to the rinse system rather than dumping the cooling water directly into the drain.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application.

What is claimed is:

1. A warewash machine, comprising:
a housing at least in part defining a chamber for cleaning wares;
a sump for collecting hot cleaning water that is recirculated in the chamber during cleaning;
a drain line for draining cleaning water from the sump;
a fresh water input system including at least a hot water input that receives hot water from a hot water source and a cold water input that receives cold water from a cold water source, the fresh water input system having a common input line in communication with the hot water input and the cold water input;
a cold water input valve for controlling input of cold water into the common input line;
a hot water input valve for controlling input of hot water into the common input line;
the drain line and the common input line arranged in a heat exchange relationship to enable heat from cleaning water traveling through the drain line to transfer heat to water traveling through the common input line;
a temperature sensor arrangement associated with the drain line for determining temperature of the cleaning water traveling through the drain line;
a controller that receives input from the temperature sensor arrangement and is configured to control the cold water input valve and the hot water input valve such that, during a draining operation, (i) if cleaning water traveling through the drain line is above a preselected temperature, the controller opens the cold water input valve to allow water from the cold water source to enter the common input line and (ii) if cleaning water traveling through the drain line is below the preselected temperature, the controller closes the cold water input valve.

2. The warewash machine of claim 1, wherein water flowing through the common input line is heated by cleaning water traveling through the drain line, the warewash machine further comprising a storage tank that receives water from the common input line once heated by cleaning water traveling through the drain line.

3. The warewash machine of claim 2 further comprising:
a rinse system; and
a pump configured to pump water from the storage tank toward the rinse system.

4. The warewash machine of claim 3 further comprising a booster heater downstream of the storage tank and that receives water from the storage tank and is configured to heat the water prior to delivering the water to the rinse system.

5. The warewash machine of claim 1, wherein, the controller is configured such that during an initial fill operation, if the temperature sensor indicates to the controller that no water above the preselected temperature is traveling through the drain line, the controller responsively opens the hot water input valve to allow hot water to enter the common input line.

6. The warewash machine of claim 1, wherein the common input line is in a counterflow heat exchange relationship with the drain line.

7. The warewash machine of claim 1, wherein water flowing through the common input line from the cold water source is heated by cleaning water traveling through the drain line to a temperature of at least about 110 degrees F. during the draining operation.

8. The warewash machine of claim 7, wherein cleaning water flowing through the drain line is cooled to a temperature of less than about 140 degrees F. by the water from the cold water source traveling through the common input line.

9. The warewash machine of claim 7, wherein cleaning water flowing through the drain line is cooled to a temperature of less than about 130 degrees F. by the water from the cold water source traveling through the common input line.

10. The warewash machine of claim 1, wherein the controller is configured to repeatedly open and close the cold water input valve to provide pulses of water from the cold water source to the common drain line during a sump dumping operation where the sump is at least substantially emptied of cleaning water through the drain line.

11. The warewash machine of claim 1 further comprising:
a heat exchanger comprising the common input line and the drain line that are in the heat exchange relationship; and
a filter system located between the sump and the heat exchanger, the filter system in communication with the drain line and configured to filter the cleaning water before the cleaning water enters the heat exchanger;
wherein the temperature sensor is located along the drain line between the sump and the heat exchanger.

12. The warewash machine of claim 11, wherein the filter system comprises a housing and a filter within the housing, at least part of the filter being visible from outside the housing.

13. A warewash machine, comprising:
a housing at least in part defining a chamber for cleaning wares;
a sump for collecting hot cleaning water that is recirculated in the chamber during cleaning;
a drain line for draining cleaning water from the sump;
a fresh water input system including at least a hot water input for receiving hot water from a hot water source and a cold water input for receiving cold water from a cold water source;
a cold water input valve for controlling input of cold water;
a hot water input valve for controlling input of hot water;
a heat exchanger arrangement between the drain line and a portion of the fresh water input system to enable heat from cleaning water traveling through the drain line to transfer to water traveling through the portion of the freshwater input system;
a temperature sensor arranged to determine at least one of temperature of cleaning water traveling through the drain line or temperature of fresh water leaving the heat exchanger arrangement;
a controller that receives input from the temperature sensor arrangement and is configured to control opening and closing of both the cold water input valve and the hot water input valve based at least in part upon sensed temperature.

14. A warewash machine, comprising:
a housing at least in part defining a chamber for cleaning wares;
a sump for collecting hot cleaning water that is recirculated in the chamber during cleaning;
a drain line for draining cleaning water from the sump;
a fresh water input system including at least a hot water input for receiving hot water from a hot water source and a cold water input for receiving cold water from a cold water source;
a cold water input valve for controlling input of cold water;
a hot water input valve for controlling input of hot water;
a heat exchanger arrangement between the drain line and a portion of the fresh water input system to enable heat from cleaning water traveling through the drain line to transfer to water traveling through the portion of the freshwater input system;
a temperature sensor arranged to determine temperature of cleaning water traveling through the drain line;
a controller that receives input from the temperature sensor arrangement and is configured to control the cold water input valve and the hot water input valve such that during a water input operation when the temperature sensor indicates a temperature above a preselected temperature the cold water valve is opened and the hot water valve is closed and when the temperature sensor indicates a temperature below the preselected temperature the cold water valve is closed and the hot water valve is opened.

* * * * *